Figures 1, 2:
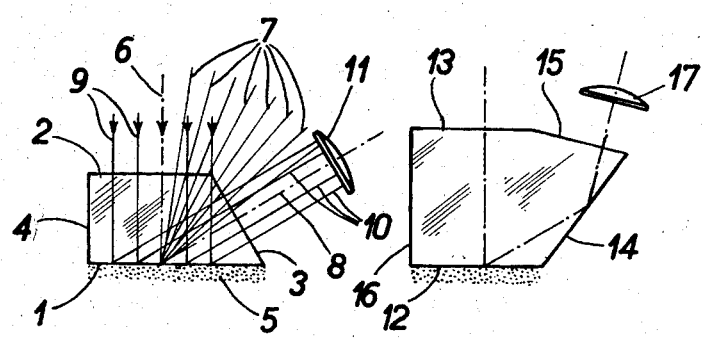

Oct. 23, 1945. G. HANSEN 2,387,581

REFRACTOMETER FOR TURBID LIQUIDS AND PULPOUS SUBSTANCES

Filed May 27, 1941

Inventor:

Patented Oct. 23, 1945

2,387,581

UNITED STATES PATENT OFFICE 2,387,581

REFRACTOMETER FOR TURBID LIQUIDS AND PULPOUS SUBSTANCES

Gerhard Hansen, Jena, Germany; vested in the Alien Property Custodian

Application May 27, 1941, Serial No. 395,408
In Germany June 19, 1940

6 Claims. (Cl. 88—14)

For determining the refractive index of liquids the known types of refractometers are being referred to as a rule, i. e. instruments where the liquid is brought in contact with a plane surface, known as the measuring surface of a measuring prism, and where in the visual field of a telescope the border line of the total reflexion of light on said measuring surface is looked for. In doing so, two different methods are usually resorted to viz., determining the position of the border line either by means of transmitted or of reflected light. The first method is well adapted for the investigation of colorless or very faintly colored liquids, while the second is preferred in the investigation of deeply colored liquids. That portion of the field which appears dark in transmitted light will appear bright in reflected light since it represents the region of total reflection on the measuring surface. The other part of the field which appears bright in transmitted light shows a diminished brightness in reflected light, since part of the light falling into said region on the measuring surface enters into the liquid and does not reach the telescope.

It has been shown that the readings of the known types of refractometers are reliable if the investigated liquids are clear. In the investigation of turbid liquids however difficulties are encountered by the dark part of the field being brightened as a result of the light being reflected by those particles which are suspended in the liquid and which cause the turbidity. Depending upon the degree of the turbidity and upon the nature of the illumination the brightening in question is a differing one and in some cases is likely completely to compensate the difference in the brightness of the field at both sides of the border line, thus making it impossible for the border line to be perceived.

The present invention eliminates said difficulties and makes it possible to investigate also turbid liquids by means of the refractometer. In addition to this the refractive index of pulpous and even of solid plastic or elastic substances, as wax or soft rubber, for instance, can be determined by means of the refractometer according to the invention. The underlying idea is to utilize the light reflected by the particles which are present in the substance under investigation and which causes the turbidity, while the light totally reflected from the measuring surface is prevented from entering the telescope. The refractometer is equipped with a measuring prism of whose bounding surfaces, which are perpendicular to one and the same plane, one serves for the entrance of light, a second one for the exit of light and a third one as the measuring surface to be brought in contact with the substance under investigation. With the aid of such a refractometer the problem in question can be solved if provisions are made to the effect that, as in accordance with the invention the light-entering surface of the measuring prism is approximately parallel to the measuring surface. The kind of illumination employed is then comparable with the dark-ground illumination as employed in microscopy.

In the case of certain types of refractometers, such as the socalled works refractometers, which are permanently attached to vessels containing the liquid to be supervised, it is not desirable that the optic axis of the telescope form an acute angle with the measuring surface of the prism forming a window in the wall of the vessel, since this position would often render observations inconvenient. To avoid an undesirable angle of this kind it is desirable to so design the measuring prism that a fourth one of said bounding surfaces is provided to so deviate any light rays which have entered the prism perpendicularly to the light-entrance surface and have left the substance under investigation that they are about parallel to the entering light rays. In doing so a pariculary simple design of measuring prism will result, if the light-entrance surface and the light-exit surface form parts of a common bounding surface of the measuring prism.

If in addition to turbid substances the same instrument is to be employed also for the investigation of clear substances, this can be effected in a simple manner by providing the measuring prism with a second bounding surface which serves for the light-entrance, this surface being inclined towards the measuring surface at an acute angle. This done, it will be possible, if so required, to carry out measurements in specularly reflected light in addition to those in diffusely reflected light. In designing such an instrument provisions must obviously be made ensuring that the light can reach the prism through one only of the two entering surfaces in order to obtain in the telescope a distinct border line free from any extraneous light.

In the annexed drawing different designs of the measuring prism and a works refractometer are illustrated representing constructional examples of the invention. Fig. 1 shows the simplest form of the measuring prism for the purpose of elucidating the measuring process. Fig. 2 indicates a second constructional form of the measuring prism. A plan view of the works refractometer is given in Fig. 3 and a side view in Fig. 4 of the drawing.

The prism according to Fig. 1 is of trapezoidal shape when viewed from its side and square when viewed from its end. Two of its bounding surfaces lying at right angles to the cross section are parallel to one another. One of these surfaces marked 1 forms the measuring surface, while the parallel surface marked 2 serves as the light-entering surface. The light-exit surface 3 inclines at an acute angle towards the measuring surface 1. The fourth bounding surface 4 whose position is optional has been assumed in the example to be perpendicular to the two parallel surfaces 1 and 2.

The light enters in the direction of the arrows at about right angles to the light-entering surface 2 and after passing through the prism falls upon the measuring surface 1 at the same angle. Apart from slight partial reflexions on said two surfaces, the light enters undiminished into the turbid liquid 5 which is in contact with measuring surface 1 and whose refractive index is to be determined. The suspended particles in the liquid 5 reflect the light and the reflected light once again enters into the prism. After the reflexion, a central ray of light 6 is dispersed in the form of a pencil of rays 7 whose border ray 8 corresponds to the grazing incidence of light into the prism on the measuring surface of same. The reflected rays originating from the light ray 6 thus brighten the region which in Fig. 1 lies at the left of the ray 8, while no reflected light can reach the region at the right of said ray. In the same manner the light originating from other entering rays 9 is reflected in liquid 5, whereby for each ray 9 a border ray 10 is formed which is parallel to the border ray 8. With the aid of a telescope lens 11 the rays 8 and 10 are fused to form a border line in such a manner that the one part of the field lying at one side of the border line appears dark and the other part lying at the other side of the border line appears bright. In other words, the lens 11 forms an image of the two light fields separated by the border line. The angle formed by the measuring surface 1 and the light coming from liquid 5 and grazingly entering the prism is known to depend upon the refractive indices of the prism and of the liquid. This angle represents a measure for the latter refractive index, since the refractive index of the prism is invariable. To investigate a pulpous substance, a sample of said substance is applied to the measuring surface, whereupon the measurement is proceeded with the same as in the case of liquids.

The second constructional example (Fig. 2) of the measuring prism is of pentagonal cross section. The bounding surfaces perpendicular to the drawn cross section are the measuring surface 12, the light-entering surface 13 parallel to the surface 12, a reflecting surface 14, the light-exit surface 15 and the bounding surface 16 which corresponds to the surface 4 of the prism according to Fig. 1 and which has no influence upon the path of the light rays. The reflecting surface 14 is so inclined to the measuring surface 12 that the reflected light rays are reflected at an obtuse angle of such an extent that the emerging rays form relatively small angles with the direction of the entering light. The light-exit surface 15 lies at about right angles to the direction of the emergent light. To the position of said surface 15 the position of the telescope lens 17 is adapted. By imparting a suitable inclination to the reflecting surface 14, the light-entrance surface 13 and the light-exit surface 15 can be made to form parts of a mutual plane bounding surface of the prism.

Figures 3, 4:
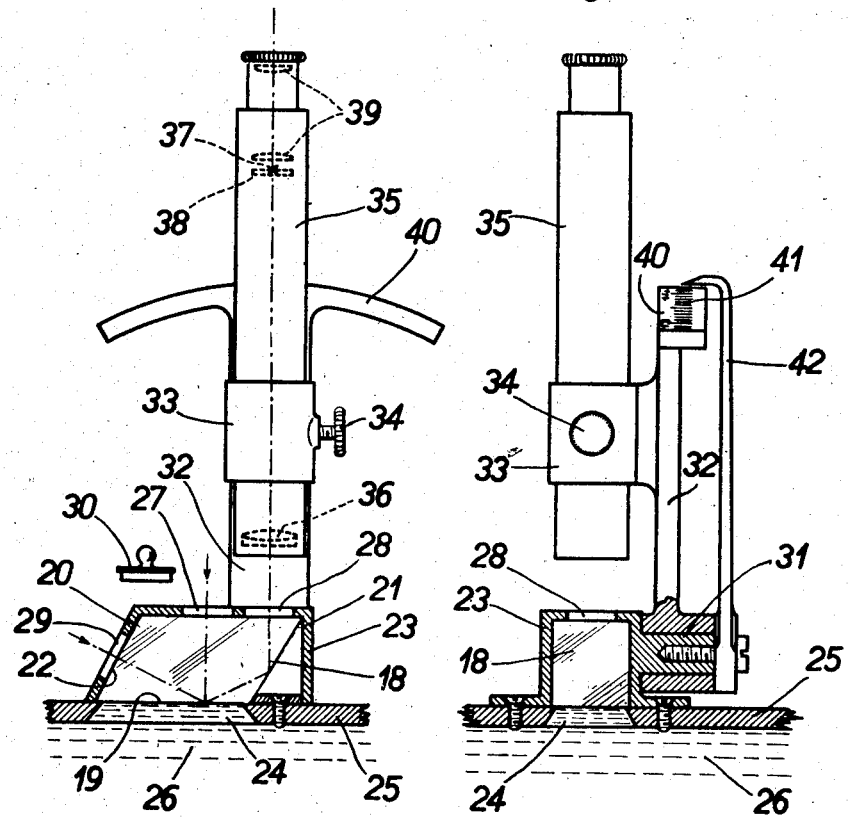

This latter case has been materialized in the works refractometer illustrated in Figs. 3 and 4. Again, the measuring prism 18 is of square cross section, when viewed from its end (Fig. 4) and of trapezoidal cross section when viewed from its side (Fig. 3), one surface 19 serving as measuring surface, a surface 20 parallel to the latter as light-entrance surface, and light-exit surface too, a further surface 21 as reflecting surface and finally, a fourth surface 22 which can likewise be used as light-entrance surface. The surface 22 is intended for tests in specularly reflected light. It is so inclined to the measuring surface 19 that, when testing a liquid having a mean refractive index, the entering light rays passing perpendicularly through surface 22 about form with the measuring surface the angle of total reflection.

The prism 18 is encased by a housing 23 which above a window 24 is screwed to the wall of a vessel 25 containing the turbid liquid 26 under investigation. Within the window 24 the liquid 26 is in contact with the measuring surface 19. In the wall covering the surface 20 the housing 23 is provided with an opening 27 for the entering light and with an opening 28 for the emergent light, while in the wall covering the surface 22 a light-entrance opening 29 is provided. To close one of the two light-entrance openings when the refractometer is in use a lid 30 is provided. On housing 23 a pin 31 is fixed about which an arm 32 can be rotated. Said arm 32 carries a sleeve 33 within which a telescope 35 is clamped in position by means of a clamping screw 34. The optical parts of the telescope comprise an objective lens 36, a glass plate 38 provided with a mark 37 and so disposed that said mark lies in the rear focal plane of said objective lens, and an ocular 39 consisting of an eye-lens and a field-lens. To the arm 32 also an arc 40 is fitted whose axis coincides with the axis of the pin 31. The arc 40 bears a scale 41 showing refractive indices which are indicated by a pointer 42 fastened to pin 31.

The refractometer is adapted for the determination of the refractive index of a turbid as well as of a clear and preferably colored liquid. When testing turbid liquids the opening 29 is closed by means of the lid 30. Apart from the additional reflexion on surface 21, the path of rays corresponds in this case to that as described in connection with Fig. 1. By swivelling the arm 32 the telescope 35 is to be set in such a manner that the border line visible in the rear focal plane of the objective 36 coincides with the mark 37. This setting having been attended to, the pointer 42 will indicate the refractive index of the liquid 26 on the scale 41. The liquid 26 being clear, the lid 30 is to be removed from the opening 29 and used for closing the opening 27. The light entering through opening 29 passes through the measuring surface 19, where it is reflected, and then enters into the liquid 26. A certain direction of the entering rays produces in the liquid light rays grazingly refracted relative to the measuring surface 19. Light rays entering at a smaller angle to the measuring surface 19 will be totally reflected at the latter. By the fusion in the plane of the mark 37 of the border rays of the total reflection through the telescope lens 36, the image of the two light fields separated by the border line is produced which, as described before, is used for determining the refractive index of the liquid.

I claim:

1. In a refractometer for determining the refractive power of turbid liquids and pulpous substances a measuring prism bounded by a number of plane surfaces which are perpendicular to one and the same plane, one of said surfaces serving the entry of light into said prism, a second of said surfaces serving the exit of light out of said prism, and a third of said surfaces serving as measuring surface and being intended to be brought in contact with the substance under investigation, said third surface being about parallel to said light-entrance surface, means for excluding light from the remaining surfaces, a swingably mounted telescope for finding the border line of the total reflection of the light at said third surface, said telescope comprising an objective, an ocular and a fiducial mark and occupying such a position relative to said prism that the light-rays emerging from said prism may enter the objective lens of the telescope, and means for indicating the angle through which the telescope is swung to bring the border line of total reflection into coincidence with said mark.

2. In a refractometer for determining the refractive power of turbid liquids and pulpous substances a measuring prism bounded by a number of plane surfaces which are perpendicular to one and the same plane, one of said surfaces serving the entry of light into said prism, a second of said surfaces serving the exit of light out of said prism, a third of said surfaces serving as measuring surface and being intended to be brought in contact with the substance under investigation, said third surface being about parallel to said light-entrance surface, and a fourth of said surfaces adapted to so deviate after their emergence from the substance under investigation the light rays which had entered said prism perpendicularly to said light-entrance surface, that said light rays will be approximately parallel to said light-entrance rays, means for excluding light from the remaining surface, a swingably mounted telescope for finding the border line of the total reflection of the light at said third surface, said telescope comprising an objective, an ocular and a fiducial mark and occupying such a position relative to said prism that the light-rays emerging from said prism may enter the objective lens of the telescope, and means for indicating the angle through which the telescope is swung to bring the border line of total reflection into coincidence with said mark.

3. In a refractometer for determining the refractive power of turbid liquids and pulpous substances a measuring prism bounded by a number of plane surfaces which are perpendicular to one and the same plane, one of said surfaces serving the entry of light into said prism and the emergence of the light out of said prism, a second one of said surfaces serving as measuring surface and being intended to be brought in contact with the substance under investigation, said second surface being approximately parallel to said surface serving for the light-entrance and light-emergence, and a third of said surfaces adapted to so deviate after their emergence from the substance under investigation the light-rays which had entered said prism perpendicularly to said light-entrance surface that said light-rays will be approximately parallel to said light-entrance rays, means for excluding light from the remaining surface, a swingably mounted telescope for finding the border line of the total reflection of the light at said second surface, said telescope comprising an objective, an ocular and a fiducial mark and occupying such a position relative to said prism that the light-rays emerging from said prism may enter the objective lens of the telescope, and means for indicating the angle through which the telescope is swung to bring the border line of total reflection into coincidence with said mark.

4. In a refractometer for determining the refractive power of turbid liquids and pulpous substances a measuring prism bounded by a number of plane surfaces which are perpendicular to one and the same plane, two of said surfaces serving the entry of light into said prism, a third of said surfaces serving the emergence of light out of said prism, and a fourth of said surfaces serving as a measuring surface and being intended to be brought in contact with the substance under investigation, said fourth surface being approximately parallel to one of said two light-entrance surfaces and being inclined at an acute angle towards the other of said two light-entrance surfaces, means for excluding light from the remaining surface, a swingably mounted telescope for finding the border line of the total reflection of the light at said third surface, said telescope comprising an objective, an ocular and a fiducial mark and occupying such a position relative to said prism that the light-rays emerging from said prism may enter the objective lens of the telescope, and means for indicating the angle through which the telescope is swung to bring the border line of total reflection into coincidence with said mark.

5. A refractometer as defined in claim 4 and further comprising removable means for excluding light from one of said light entry surfaces.

6. In a refractometer for determining the refractive power of turbid liquids and pulpous substances a measuring prism bounded by a number of plane surfaces which are perpendicular to one and the same plane, one of said surfaces serving the entry of light into said prism, a second of said surfaces serving the exit of light out of said prism, and a third of said surfaces serving as measuring surface and being intended to be brought in contact with the substance under investigation, said third surface being about parallel to said light-entrance surface, a swingably mounted telescope, said telescope comprising an objective, an ocular and a fiducial mark and occupying such a position relative to said prism that the light rays emerging from said prism may enter the objective lens of the telescope, and means for indicating the angular inclination of said telescope when the border line of total reflection is brought into coincidence with said mark through the movement of the telescope.

GERHARD HANSEN.